US012020890B2

(12) United States Patent
Zhang

(10) Patent No.: US 12,020,890 B2
(45) Date of Patent: Jun. 25, 2024

(54) FIELD EMISSION CATHODE DEVICE AND METHOD OF FORMING A FIELD EMISSION CATHODE DEVICE

(71) Applicant: NCX Corporation, Raleigh, NC (US)

(72) Inventor: Jian Zhang, Durham, NC (US)

(73) Assignee: NCX Corporation, Raleigh, NC (US)

( * ) Notice: Subject to any disclaimer, the term of this patent is extended or adjusted under 35 U.S.C. 154(b) by 0 days.

(21) Appl. No.: 18/247,257

(22) PCT Filed: Sep. 29, 2021

(86) PCT No.: PCT/IB2021/058945
§ 371 (c)(1),
(2) Date: Mar. 29, 2023

(87) PCT Pub. No.: WO2022/070100
PCT Pub. Date: Apr. 7, 2022

(65) Prior Publication Data

US 2023/0369002 A1 Nov. 16, 2023

Related U.S. Application Data

(60) Provisional application No. 63/085,438, filed on Sep. 30, 2020.

(51) Int. Cl.

| | |
|---|---|
| ***H01J 1/46*** | (2006.01) |
| ***H01J 1/304*** | (2006.01) |
| ***H01J 9/18*** | (2006.01) |

(52) U.S. Cl.
CPC ................ *H01J 1/46* (2013.01); *H01J 1/304* (2013.01); *H01J 9/18* (2013.01)

(58) Field of Classification Search
CPC ................ H01J 1/46; H01J 1/304; H01J 9/18
See application file for complete search history.

(56) References Cited

U.S. PATENT DOCUMENTS

2012/0153802 A1* 6/2012 Tang ..................... H01J 1/304
313/310

FOREIGN PATENT DOCUMENTS

| | | |
|---|---|---|
| DE | 10 2008 026633 | 12/2009 |
| JP | S4831868 | 4/1973 |
| JP | H0877916 | 3/1996 |

(Continued)

OTHER PUBLICATIONS

Office Action issued May 7, 2024, in corresponding Japanese application No. 2023-520062.

*Primary Examiner* — Elmito Breval
(74) *Attorney, Agent, or Firm* — Womble Bond Dickinson (US) LLP

(57) ABSTRACT

A field emission cathode device and formation method involves a rotating field emission cathode including a field emission material deposited on a surface thereof, the field emission cathode rotating about an axis and being electrically connected to ground, and a planar gate electrode extending parallel to the surface of the rotating field emission cathode and defining a gap therebetween. A gate voltage source is electrically connected to the gate electrode and is arranged to interact therewith to generate an electric field, with the electric field inducing a portion of the surface of the rotating field emission cathode adjacent to the gate electrode to emit electrons from the field emission material toward and through the gate electrode.

21 Claims, 5 Drawing Sheets

(56) References Cited

FOREIGN PATENT DOCUMENTS

| | | |
|---|---|---|
| JP | 2011-145259 | 7/2011 |
| KR | 2008 0103286 | 11/2008 |
| KR | 10-2010-0123987 | 11/2010 |

* cited by examiner

FIELD EMISSION CATHODE DEVICE AND METHOD OF FORMING A FIELD EMISSION CATHODE DEVICE

CROSS-REFERENCE TO RELATED APPLICATIONS

This application is a national stage filing under 35 U.S.C. 371 of PCT/IB2021/058945, filed Sep. 29, 2021, which International Application was published by the International Bureau in English on Apr. 7, 2022, as WO 2022/070100, and application claims priority from U.S. Application No. 63/085,438, filed on Sep. 30, 2020, which applications are hereby incorporated in their entirety by reference in this application.

BACKGROUND

Field of the Disclosure

The present application relates to field emission cathode devices and, more particularly, to a field emission cathode device and method of forming a field emission cathode device.

Description of Related Art

A typical field emission cathode assembly includes a field emission cathode and an extraction gate structure with certain gap distance in between, an example of which is shown in FIG. 1. The cathode is generally a conductive substrate with a deposition layer of a field emission material on a cathode surface adjacent to the extraction gate structure. In such prior art examples, an external voltage (VG) is applied to the gate electrode, while the cathode is electrically grounded, in order to extract field emission electrons (e.g., a field emission current) out of the cathode surface.

Figure 2:
Figure 3A:
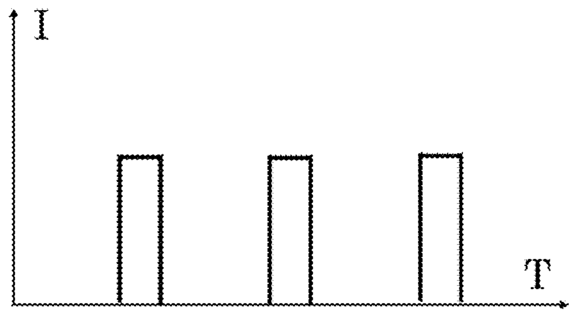
FIG. 3A Prior Art
Figure 3B:
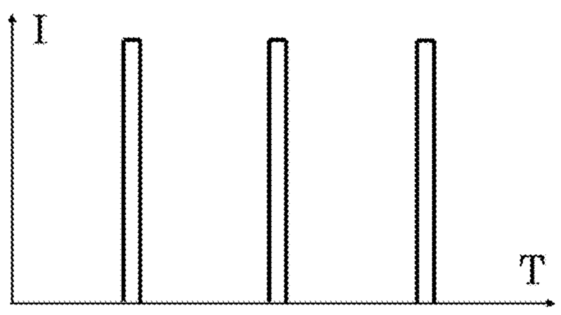
FIG. 3B Prior Art

An emission area of the cathode is defined by the total area of deposition layer of the field emission material. In order to generate a stable field emission current, the field emission cathode can only be operated continuously under a certain threshold of maximum current density, as shown in FIG. 2. Often for high power/high current situations, the cathode can only be operated stably in a pulsing mode, particularly with a short pulse width or duration (e.g., generate current on and off over a selected time in order to achieve stable operation and at a particular duty cycle). As shown in FIG. 3A, compared with the DC (continuous) mode in FIG. 2, it is possible to achieve higher peak current while running at pulse mode. With even shorter pulse width (duration) than that shown in FIG. 3A, it is possible to further increase the peak current without causing cathode degradation, as shown in FIG. 3B.

However, operating the cathode in this manner may result in damage to the gate electrode, for example, due to cathode hotspots (e.g., non-uniformities in the field emission layer on the cathode surface can cause higher peak current in some areas of the cathode than others) and/or damage to the cathode from electron bombardment (e.g., reflection of electrons from the gate electrode back to the cathode). The higher peak currents can also stress the cathode, possibly resulting in decreased service life.

Thus, there exists a need for a field emission cathode and formation method for a field emission cathode that increases the maximum current output (electron emission) of a field emission cathode with improved uniformity, while minimize cathode stress so as to increase cathode service life. Such a cathode and formation method should desirably avoid potential gate electrode damage caused by cathode hotspots, while mitigating possible cathode degradation from ion bombardment.

SUMMARY OF THE DISCLOSURE

The above and other needs are met by aspects of the present disclosure which includes, without limitation, the following example embodiments and, in one particular aspect, provides a field emission cathode device, wherein such a device comprises a rotating field emission cathode including a field emission material deposited on a surface thereof, with the field emission cathode rotating about an axis and being electrically connected to ground. A planar gate electrode extends parallel to the surface of the rotating field emission cathode and defines a gap therebetween. A gate voltage source is electrically connected to the gate electrode and is arranged to interact therewith to generate an electric field. The electric field induces a portion of the surface of the rotating field emission cathode adjacent to the gate electrode to emit electrons from the field emission material toward and through the gate electrode.

Another example aspect provides a method of forming a field emission cathode device, comprising disposing a planar gate electrode adjacent and parallel to the surface of a rotating field emission cathode to define a gap therebetween, wherein the rotating field emission cathode includes a field emission material deposited on the surface thereof, is electrically connected to ground, and rotates about an axis extending therethrough. A gate voltage source is interacted with the gate electrode electrically connected thereto to generate an electric field, wherein the electric field is arranged to induce a portion of the surface of the rotating field emission cathode adjacent to the gate electrode to emit electrons from the field emission material toward and through the gate electrode.

The present disclosure thus includes, without limitation, the following example embodiments:

Example Embodiment 1: A field emission cathode device, comprising a rotating field emission cathode including a field emission material deposited on a surface thereof, the field emission cathode rotating about an axis and being electrically connected to ground; a planar gate electrode extending parallel to the surface of the rotating field emission cathode and defining a gap therebetween; and a gate voltage source electrically connected to the gate electrode and arranged to interact therewith to generate an electric field, the electric field inducing a portion of the surface of the rotating field emission cathode adjacent to the gate electrode to emit electrons from the field emission material toward and through the gate electrode.

Example Embodiment 2: The device of any preceding example embodiment, or combinations thereof, wherein the surface of the field emission cathode is a cylindrical surface of a cylindrical substrate, and wherein the axis is a longitudinal axis extending along the cylindrical substrate.

Example Embodiment 3: The device of any preceding example embodiment, or combinations thereof, wherein the gate electrode extends parallel to the cylindrical surface of the cylindrical substrate.

Example Embodiment 4: The device of any preceding example embodiment, or combinations thereof, wherein the electric field generated by the gate voltage source is arranged to induce an angularly-extending portion of the cylindrical surface of the rotating cylindrical substrate adjacent to the gate electrode to emit the electrons from the field emission material toward and through the gate electrode.

Example Embodiment 5: The device of any preceding example embodiment, or combinations thereof, wherein a magnitude of the angularly-extending portion of the cylindrical surface is proportional to a dimension of the gap between the gate electrode and the cylindrical surface.

Example Embodiment 6: The device of any preceding example embodiment, or combinations thereof, wherein the gate voltage source is arranged to apply a constant (DC) voltage or a pulsed voltage to the gate electrode.

Example Embodiment 7: The device of any preceding example embodiment, or combinations thereof, wherein the gate voltage source is arranged to apply a pulsed voltage to the gate electrode, and wherein a magnitude of the pulsed voltage is inversely proportional to a pulse duration of the pulsed voltage.

Example Embodiment 8: The device of any preceding example embodiment, or combinations thereof, wherein the surface of the field emission cathode is a laterally-extending circular surface of a discoid substrate, and wherein the axis extends through the discoid substrate perpendicularly to the circular surface.

Example Embodiment 9: The device of any preceding example embodiment, or combinations thereof, wherein the gate electrode extends parallel and adjacent to a portion of the circular surface of the discoid substrate, at least between the axis and an outer perimeter of the circular surface.

Example Embodiment 10: The device of any preceding example embodiment, or combinations thereof, wherein the electric field generated by the gate voltage source is arranged to induce the portion of the circular surface of the rotating discoid substrate adjacent to the gate electrode to emit the electrons from the field emission material toward and through the gate electrode.

Example Embodiment 11: The device of any preceding example embodiment, or combinations thereof, wherein a magnitude of the portion of the circular surface is proportional to an angular dimension of the gate electrode.

Example Embodiment 12: A method of forming a field emission cathode device, comprising disposing a planar gate electrode adjacent and parallel to the surface of a rotating field emission cathode to define a gap therebetween, the rotating field emission cathode including a field emission material deposited on the surface thereof, being electrically connected to ground, and rotating about an axis extending therethrough; and interacting a gate voltage source with the gate electrode electrically connected thereto to generate an electric field, the electric field being arranged to induce a portion of the surface of the rotating field emission cathode adjacent to the gate electrode to emit electrons from the field emission material toward and through the gate electrode.

Example Embodiment 13: The method of any preceding example embodiment, or combinations thereof, wherein disposing the planar gate electrode comprises disposing the planar gate electrode adjacent and parallel to a cylindrical surface of a cylindrical substrate of the rotating field emission cathode, with the axis being a longitudinal axis extending along the cylindrical substrate.

Example Embodiment 14: The method of any preceding example embodiment, or combinations thereof, wherein disposing the planar gate electrode comprises disposing the planar gate electrode adjacent and parallel to the cylindrical surface of the cylindrical substrate.

Example Embodiment 15: The method of any preceding example embodiment, or combinations thereof, wherein interacting the gate voltage source with the gate electrode comprises interacting the gate voltage source with the gate electrode such that the electric field generated by the gate voltage source is arranged to induce an angularly-extending portion of the cylindrical surface of the rotating cylindrical substrate adjacent to the gate electrode to emit the electrons from the field emission material.

Example Embodiment 16: The method of any preceding example embodiment, or combinations thereof, wherein disposing the planar gate electrode comprises disposing the planar gate electrode adjacent and parallel to the surface of the rotating field emission cathode such that a magnitude of the angularly-extending portion of the cylindrical surface is proportional to a dimension of the gap between the gate electrode and the cylindrical surface.

Example Embodiment 17: The method of any preceding example embodiment, or combinations thereof, wherein interacting the gate voltage source with the gate electrode comprises interacting the gate voltage source with the gate electrode to apply a constant (DC) voltage or a pulsed voltage to the gate electrode.

Example Embodiment 18: The method of any preceding example embodiment, or combinations thereof, wherein interacting the gate voltage source with the gate electrode comprises interacting the gate voltage source with the gate electrode to apply a pulsed voltage to the gate electrode, with a magnitude of the pulsed voltage being inversely proportional to a pulse duration of the pulsed voltage.

Example Embodiment 19: The method of any preceding example embodiment, or combinations thereof, wherein disposing the planar gate electrode comprises disposing the planar gate electrode adjacent and parallel to a laterally-extending circular surface of a discoid substrate, with the axis extending through the discoid substrate perpendicularly to the circular surface.

Example Embodiment 20: The method of any preceding example embodiment, or combinations thereof, wherein disposing the planar gate electrode comprises disposing the planar gate electrode parallel and adjacent to a portion of the circular surface of the discoid substrate, at least between the axis and an outer perimeter of the circular surface.

Example Embodiment 21: The method of any preceding example embodiment, or combinations thereof, wherein interacting the gate voltage source with the gate electrode comprises interacting the gate voltage source with the gate electrode such that the electric field generated by the gate voltage source is arranged to induce the portion of the circular surface of the rotating discoid substrate adjacent to the gate electrode to emit the electrons from the field emission material.

Example Embodiment 22: The method of any preceding example embodiment, or combinations thereof, wherein disposing the planar gate electrode comprises disposing the planar gate electrode adjacent and parallel to the surface of the rotating field emission cathode such that a magnitude of the portion of the circular surface is proportional to an angular dimension of the gate electrode.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 1A:
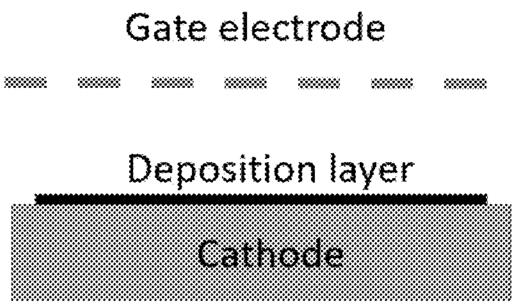
Figure 1B:
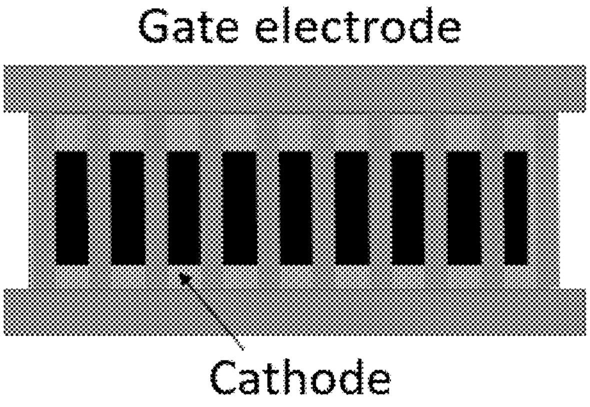
Figure 4:
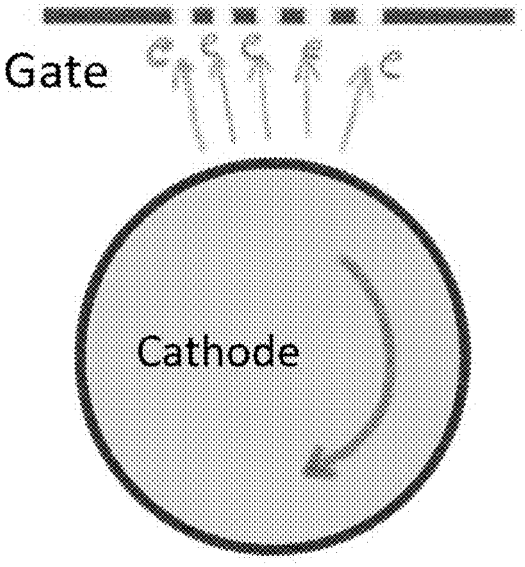
Figure 4A:
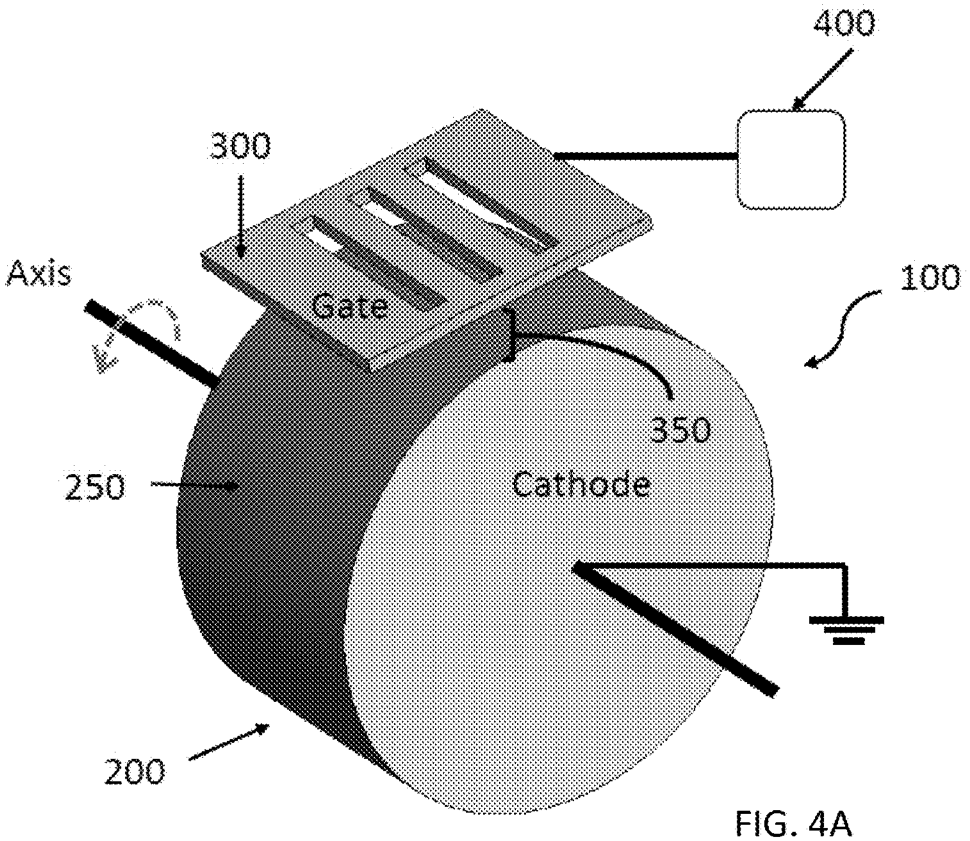

Having thus described the disclosure in general terms, reference will now be made to the accompanying drawings, which are not necessarily drawn to scale, and wherein:

FIG. 1A schematically illustrates a side view of a prior art example of a field emission cathode device;

FIG. 1B schematically illustrates a plan view of the prior art example of a field emission cathode device as shown in FIG. 1A;

FIG. 2 schematically illustrates a field emission current from a field emission cathode operated in a DC (continuous) voltage mode;

FIG. 3A schematically illustrates a peak field emission current from a field emission cathode operated in a pulsed voltage mode;

FIG. 3B schematically illustrates a peak field emission current from a field emission cathode operated in a pulsed voltage mode with a smaller pulse duration than the pulse duration in FIG. 3A;

FIG. 4 schematically illustrates a cross-sectional view of a field emission cathode device having a planar gate electrode and a rotating cathode, according to one aspect of the present disclosure;

FIG. 4A schematically illustrates a perspective view of a field emission cathode device having a planar gate electrode and a rotating cylindrical cathode, according to the aspect of the present disclosure shown in FIG. 4.

Figure 5A:
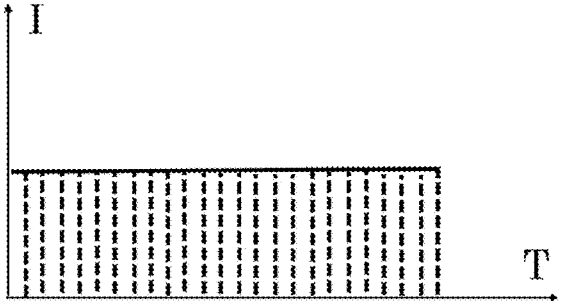
Figure 5B:
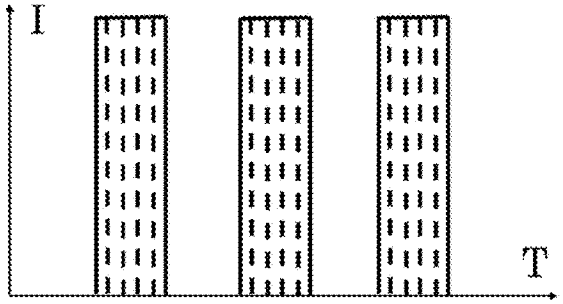
Figure 6:
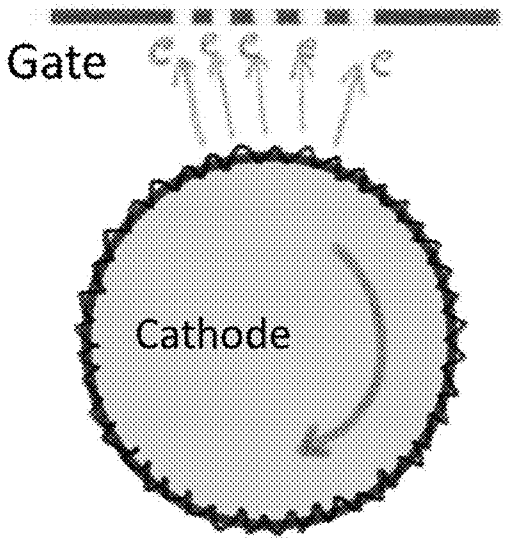
Figure 7:
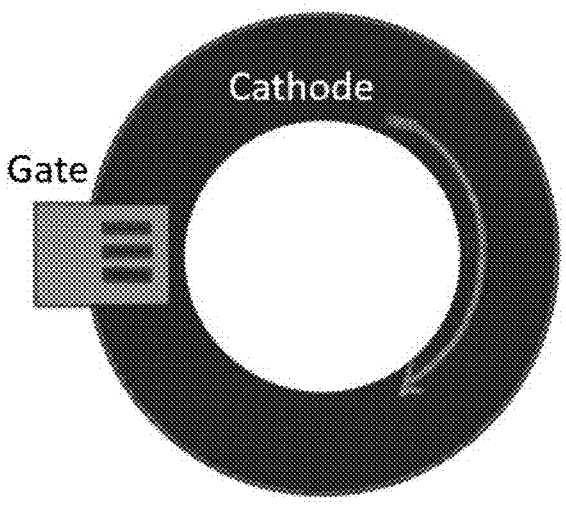
Figure 7A:
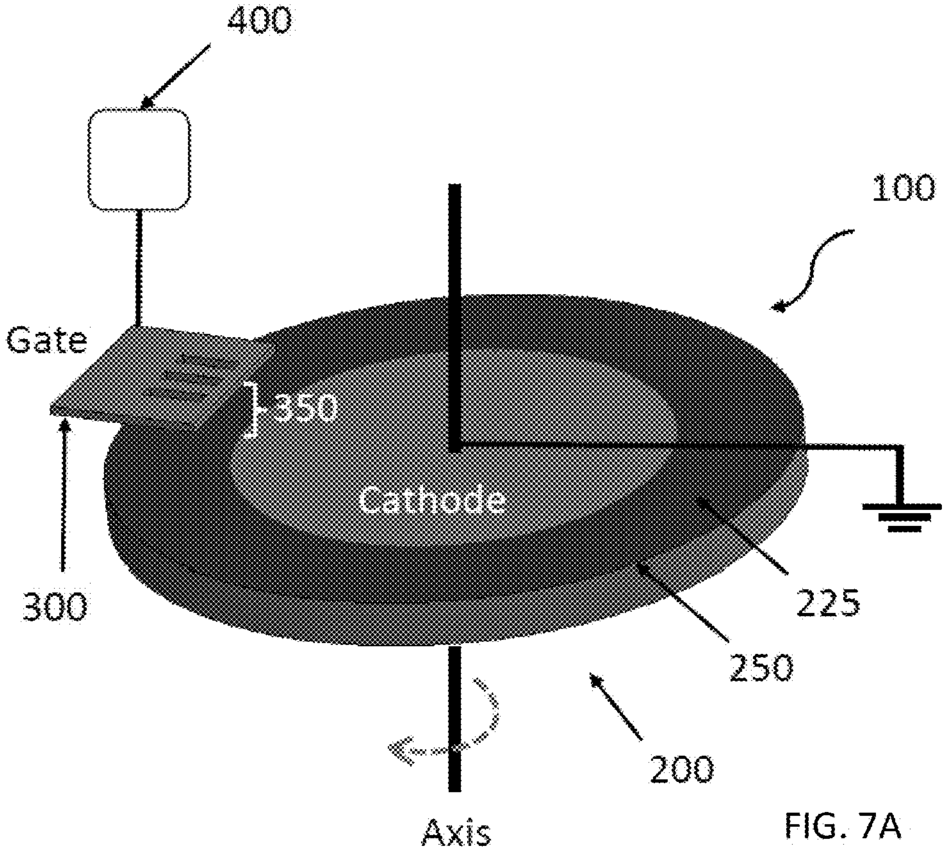

FIG. 5A schematically illustrates a field emission current from a field emission cathode having a planar gate electrode and a rotating cathode, according to the aspect of the present disclosure shown in FIG. 4, operated in a DC (continuous) voltage mode;

FIG. 5B schematically illustrates a peak field emission current from a field emission cathode having a planar gate electrode and a rotating cathode, according to the aspect of the present disclosure shown in FIG. 4, operated in a pulsed voltage mode with a relatively large pulse duration;

FIG. 6 schematically illustrates a cross-sectional view of a field emission cathode device having a planar gate electrode and a rotating cathode, according to one aspect of the present disclosure, showing the cathode having a rough surface and uneven deposition of the field emission layer;

FIG. 7 schematically illustrates plan view of a field emission cathode device, according to another aspect of the present disclosure, with a rotating discoid cathode having a gate electrode adjacent to a circular surface of the discoid cathode; and FIG. 7A schematically illustrates perspective view of a field emission cathode device, according to the aspect of the present disclosure shown in FIG. 7, with a rotating discoid cathode having a gate electrode adjacent to a circular surface of the discoid cathode.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

As noted herein, it would be desirable for a field emission cathode device that demonstrates increased maximum current output (electron emission) of the field emission cathode with improved uniformity of the electron emission, while minimizing cathode stress. However, operating a prior art field emission cathode device in this manner may result in damage to the gate electrode, for example, due to cathode hotspots (e.g., non-uniformities in the field emission layer on the cathode surface can cause higher peak current in some areas of the cathode than others) and/or damage to the cathode from electron bombardment (e.g., reflection of electrons from the gate electrode back to the cathode). The higher peak currents can also stress the cathode, possibly resulting in decreased service life.

FIGS. 4, 6, and 7 illustrate various aspects of a field emission cathode device 100 according to the present disclosure. In some aspects, the field emission cathode device 100 includes a rotating field emission cathode 200 (see, e.g., FIG. 4), with the cathode 200 having a field emission material 225 deposited on a surface 250 thereof (see, e.g., FIG. 1A). The field emission cathode 200 is further arranged to rotate about an axis and is electrically connected to ground. A planar gate electrode 300 extends parallel to the surface 250 of the rotating field emission cathode 200 such that a gap 350 is defined therebetween. A gate voltage source 400 is electrically connected to the gate electrode 300 and is arranged to interact with the gate electrode 300 to generate an electric field between the gate electrode 300 and the cathode 200. The generated electric field interacts with the surface 250 of the cathode 200 so as to induce a portion of the surface 250 (having the field emission material 225 deposited thereon) of the rotating field emission cathode 200 adjacent to the gate electrode 300 to emit electrons 500 from the field emission material 225 toward and through the gate electrode 300.

As such, the portion of the cathode surface 250 adjacent to and opposed from the gate electrode 300 and exposed to the electric filed is the only portion of the cathode 200 to emit electrons 500 therefrom at any given time during rotation of the cathode 200. Accordingly, detrimental factors such as hotspots and local non-uniformities in and surface roughness of the field emission material 225 are minimized or eliminated in light of the rotation of the cathode 200 during operation of the field emission cathode device 100. In addition, possible cathode degradation from ion bombardment is also minimized or eliminated. Therefore, with the increased uniformity and elimination/minimization of detrimental factors, the maximum current output (electron emission) of the field emission cathode is improved, while cathode stress is minimized (e.g., only a portion of the cathode is energized at a given time and that portion is not again re-energized until the cathode makes a full rotation). As such an increase in cathode service life is anticipated.

In particular aspects, the substrate 210 (see, e.g., FIG. 1A) defining the cathode 200 is comprised of a metal or other electrically conductive material such as stainless steel, tungsten, molybdenum, doped silicon. In such aspects, the field emission material 225 deposited on the surface of the substrate 210 comprises a layer of nanotubes, nanowires, graphene, amorphous carbon, or combinations thereof. The gate electrode 300 is generally comprised of a conductive material with a high melting temperature, such as, for example, tungsten, molybdenum, stainless steel, or doped silicon. Further, in some aspects, the gap 350 defined between the gate electrode 300 and the surface 250 of the substrate 200 (the gap 350 is actually defined between the surface of the field emission material 225 deposited on the surface 250 of the substrate 210/cathode 200 and the gate electrode 300, and reference to the surface 250 of the substrate 210 or cathode 200 herein is expressly intended to signify the surface of the field emission material 225 where applicable) is between, for example, about 100 μm and about 1 mm.

Aspects of the present disclosure thus improve uniformity of electron field emission from the rotating cathode 200, even though the rotating field emission cathode 200 may have a relatively rough surface morphology and uneven emitter deposition (see, e.g., FIG. 6). Detrimental factors causing non-uniform field emission currents including, for example, potential hotspots (causing gate electrode damage) are minimized or eliminated while the cathode 200 is rotating during operation, thereby improving overall field emission uniformity. Aspects of the present disclosure thus reduce, minimize or eliminate potential hotspots that generate excessive amount of (electron) current concentrated in or emitted from small localized area of the cathode 200, which may cause gate electrode damage from ion bombardment. Rotation of the cathode 200 will distribute or otherwise minimize the hotspot current over a larger area (due to rotation of the cathode) to reduce the risk of gate electrode damage, but will also mitigate cathode degradation from ion bombardment. That is, while cathode 200 is rotating, only a small/localized portion of the cathode is exposed to the opening of the gate mesh (and thus ion bombardment from reflection of electrons from the gate electrode), which will extend cathode service lifetime by minimizing exposure thereof to ion bombardment.

In one particular aspect, as shown in FIGS. 4 and 6, the surface 250 of the field emission cathode 200 is a cylindrical surface of a cylindrical substrate. In such an aspect, the axis is a longitudinal axis extending along and through the cylindrical substrate (e.g., the cylindrical cathode 200 rotates about the longitudinal axis of the cylinder). As such, the field emission material 225 is deposited on the outer cylindrical surface of the cylinder (see, e.g., FIG. 6). In such aspects, the planar gate electrode 300 extends parallel to the cylindrical surface of the cylindrical substrate. Though the gate electrode is disclosed as being planar in this aspect, one skilled in the art will appreciate that other configurations of the gate electrode are also anticipated. For example, the cross section of the gate electrode could be arcuate, whether concave or convex with respect to the cylindrical substrate, within the scope of the present disclosure.

In aspects involving a rotating cylindrical cathode 200, the electric field generated by the gate voltage source 400 and the gate electrode 300 is arranged to induce an angularly-extending portion of the cylindrical surface of the rotating cylindrical substrate (e.g., a sector or angular portion of the cylinder, from a cross-sectional perspective, extending along the length of the cylinder), adjacent to the gate electrode 300, to emit the electrons 500 from the field emission material 225 toward and through the gate electrode 300. In particular instances, the magnitude of the angularly-extending portion of the cylindrical surface induced by the electric field is proportional to a dimension of the gap 350 between the gate electrode 300 and the cylindrical surface, or the dimension (length and/or width) of the gate electrode 300. With such an arrangement, any given area of the cylindrical surface is induced to emit electrons for a shorter time period as compared to prior art field emission cathode devices as shown, for example, in FIGS. 1A and 1B.

In some aspects, the gate voltage source 400 is arranged to apply a constant (DC) voltage (see, e.g., FIG. 5A) or a pulsed voltage (see, e.g., FIG. 5B) to the gate electrode 300. In instances where the gate voltage source 400 is arranged to apply a pulsed voltage to the gate electrode 300, the magnitude of the pulsed voltage is inversely proportional to a pulse duration of the pulsed voltage. That is, a sufficiently large field emission current can be obtained by applying a relatively lower gate voltage to the gate electrode 300 for a relatively longer duration (see, e.g., FIG. 5B) without breakdown or shortened service life of the cathode 200 (or the gate electrode 300) due to, for example, cathode hotspots, a non-uniform emission current, electron bombardment, or the like. Moreover, with the cathode 200 continuously rotating while emitting electrons 500, for any given emitting area on the rotating surface only emits electrons for a much shorter period of time compared to prior art field emission cathode devices (such as shown, e.g., in FIGS. 1A and 1B). Thus, higher emission current can be generated for extended period of time, either in DC mode (FIG. 5A) or longer pulse mode (FIG. 5B) compared to such prior art field emission cathode devices.

One skilled in the art will appreciate that different variations of a field emission cathode device 100 implementing a rotating cathode 200 are also anticipated in the present disclosure. For example, as shown in FIG. 7, some alternate aspects of the disclosure include a field emission cathode device 100 implementing a field emission cathode 200 arranged as a rotating disk having a field emission material 225 deposited on the laterally-extending circular surface of the disk and rotating about an axis perpendicular to the laterally-extending circular surface. In such aspects, the gate electrode 300 is adjacent and parallel to the laterally-extending circular surface of the disk so as to define a particular gap therebetween. As such, while the disk is rotating about the axis, only the area of the cathode directly adjacent to the gate structure will be emitting electrons in response to the electric field.

That is, in alternate aspects, the surface of the field emission cathode 200 is a laterally-extending circular surface of a discoid substrate, wherein the rotational axis extends through the discoid substrate perpendicularly to the circular surface. With the discoid substrate rotating about the rotational axis, the gate electrode 300 extends parallel and adjacent to a portion of the circular surface of the discoid substrate, at least between the axis and an outer perimeter of the circular surface. The electric field generated by the gate voltage source 400 is thus arranged to induce the portion of the circular surface of the rotating discoid substrate adjacent to the gate electrode 300 at any given time during rotation of the discoid cathode to emit the electrons from the field emission material toward and through the gate electrode 300. In particular aspects, the magnitude of the portion of the circular surface is proportional to an angular dimension or area of the gate electrode 300 adjacent to the discoid cathode.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A field emission cathode device, comprising:

a rotating field emission cathode including a field emission material deposited on a surface thereof, the field emission cathode rotating about an axis extending therethrough and being electrically connected to ground;

a planar gate electrode extending parallel to a portion of the surface of the rotating field emission cathode and defining a gap therebetween; and a gate voltage source electrically connected to the gate electrode and arranged to interact therewith to generate an electric field between the gate electrode and the rotating field emission cathode, the electric field inducing the portion of the surface of the rotating field emission cathode adjacent to the gate electrode to emit electrons from the field emission material toward and through the gate electrode.

2. The device of claim 1, wherein the surface of the field emission cathode is a cylindrical surface of a cylindrical substrate, and wherein the axis is a longitudinal axis extending along and longitudinally through the cylindrical substrate.

3. The device of claim 2, wherein the gate electrode extends parallel to a portion of the cylindrical surface of the cylindrical substrate.

4. The device of claim 3, wherein the electric field between the gate electrode and the rotating field emission cathode generated by the gate voltage source is arranged to induce an angularly-extending portion of the cylindrical surface of the rotating cylindrical substrate adjacent to the gate electrode to emit the electrons from the field emission material toward and through the gate electrode.

5. The device of claim 4, wherein a magnitude of the angularly—extending portion of the cylindrical surface is proportional to a dimension of the gap between the gate electrode and the cylindrical surface.

6. The device of claim 1, wherein the gate voltage source is arranged to apply a constant (DC) voltage or a pulsed voltage to the gate electrode.

7. The device of claim 1, wherein the gate voltage source is arranged to apply a pulsed voltage to the gate electrode, and wherein a magnitude of the pulsed voltage is inversely proportional to a pulse duration of the pulsed voltage.

8. The device of claim 1, wherein the surface of the field emission cathode is a laterally-extending circular surface of a discoid substrate, and wherein the axis extends through the discoid substrate perpendicularly to the circular surface.

9. The device of claim 8, wherein the gate electrode extends parallel and adjacent to a portion of the circular surface of the discoid substrate, at least between the axis and an outer perimeter of the circular surface.

10. The device of claim 9, wherein the electric field between the gate electrode and the rotating field emission cathode generated by the gate voltage source is arranged to induce the portion of the circular surface of the rotating discoid substrate adjacent to the gate electrode to emit the electrons from the field emission material toward and through the gate electrode.

11. The device of claim 10, wherein a magnitude of the portion of the circular surface is proportional to an angular dimension of the gate electrode.

12. A method of forming a field emission cathode device, comprising:

disposing a planar gate electrode adjacent and parallel to a portion of a surface of a rotating field emission cathode to define a gap therebetween, the rotating field emission cathode including a field emission material deposited on the surface thereof, being electrically connected to ground, and rotating about an axis extending therethrough; and interacting a gate voltage source with the gate electrode electrically connected thereto to generate an electric field between the gate electrode and the rotating field emission cathode, the electric field being arranged to induce the portion of the surface of the rotating field emission cathode adjacent to the gate electrode to emit electrons from the field emission material toward and through the gate electrode.

13. The method of claim 12, wherein disposing the planar gate electrode comprises disposing the planar gate electrode adjacent and parallel to a portion of a cylindrical surface of a cylindrical substrate of the rotating field emission cathode, with the axis being a longitudinal axis extending along and longitudinally through the cylindrical substrate.

14. The method of claim 13, wherein interacting the gate voltage source with the gate electrode comprises interacting the gate voltage source with the gate electrode such that the electric field between the gate electrode and the rotating field emission cathode generated by the gate voltage source is arranged to induce an angularly-extending portion of the cylindrical surface of the rotating cylindrical substrate adjacent to the gate electrode to emit the electrons from the field emission material.

15. The method of claim 14, wherein disposing the planar gate electrode comprises disposing the planar gate electrode adjacent and parallel to the portion of the surface of the rotating field emission cathode such that a magnitude of the angularly-extending portion of the cylindrical surface is proportional to a dimension of the gap between the gate electrode and the cylindrical surface.

16. The method of claim 12, wherein interacting the gate voltage source with the gate electrode comprises interacting the gate voltage source with the gate electrode to apply a constant (DC) voltage or a pulsed voltage to the gate electrode.

17. The method of claim 12, wherein interacting the gate voltage source with the gate electrode comprises interacting the gate voltage source with the gate electrode to apply a pulsed voltage to the gate electrode, with a magnitude of the pulsed voltage being inversely proportional to a pulse duration of the pulsed voltage.

18. The method of claim 12, wherein disposing the planar gate electrode comprises disposing the planar gate electrode adjacent and parallel to a portion of a laterally-extending circular surface of a discoid substrate, with the axis extending through the discoid substrate perpendicularly to the circular surface.

19. The method of claim 18, wherein disposing the planar gate electrode comprises disposing the planar gate electrode parallel and adjacent to the portion of the circular surface of the discoid substrate, at least between the axis and an outer perimeter of the circular surface.

20. The method of claim 19, wherein interacting the gate voltage source with the gate electrode comprises interacting the gate voltage source with the gate electrode such that the electric field between the gate electrode and the rotating field emission cathode generated by the gate voltage source is arranged to induce the portion of the circular surface of the rotating discoid substrate adjacent to the gate electrode to emit the electrons from the field emission material.

21. The method of claim 20, wherein disposing the planar gate electrode comprises disposing the planar gate electrode adjacent and parallel to the portion of the surface of the rotating field emission cathode such that a magnitude of the portion of the circular surface is proportional to an angular dimension of the gate electrode.

* * * * *